United States Patent [19]

Ogi

[11] Patent Number: 5,361,375
[45] Date of Patent: Nov. 1, 1994

[54] VIRTUAL COMPUTER SYSTEM HAVING INPUT/OUTPUT INTERRUPT CONTROL OF VIRTUAL MACHINES

[75] Inventor: Yoshifumi Ogi, Kawasaki, Japan

[73] Assignee: Fujitsu Limited, Kawasaki, Japan

[21] Appl. No.: 65,685

[22] Filed: May 24, 1993

Related U.S. Application Data

[63] Continuation of Ser. No. 477,547, Feb. 9, 1990, abandoned.

[30] Foreign Application Priority Data

Feb. 9, 1989 [JP] Japan .................................. 1-30415

[51] Int. Cl.$^5$ .............................................. G06F 9/00
[52] U.S. Cl. ..................................... 395/800; 395/650; 364/DIG. 1; 364/228.2; 364/131
[58] Field of Search ............... 395/650, 800, 275, 425, 395/200; 364/131

[56] References Cited

U.S. PATENT DOCUMENTS

| | | |
|---|---|---|
| 4,001,783 | 1/1977 | Monahan et al. ..................... 395/650 |
| 4,400,769 | 8/1983 | Kaneda et al. ........................ 395/650 |
| 4,524,415 | 6/1985 | Mills, Jr. et al. ..................... 395/575 |
| 4,564,903 | 1/1986 | Guyette et al. ....................... 395/425 |
| 4,658,351 | 4/1987 | Teng .................................... 395/650 |
| 4,689,739 | 8/1987 | Federico et al. ..................... 395/725 |
| 4,734,882 | 3/1988 | Romagosa ............................ 395/725 |
| 4,835,685 | 5/1989 | Kun ..................................... 395/650 |
| 4,837,674 | 6/1989 | Takane ................................. 395/275 |
| 4,843,541 | 6/1989 | Bean et al. ........................... 395/275 |
| 4,860,190 | 8/1989 | Kaneda et al. ....................... 364/200 |
| 4,885,681 | 12/1989 | Umeno et al. ........................ 395/700 |
| 4,887,202 | 12/1989 | Tanaka et al. ........................ 364/200 |
| 4,908,750 | 3/1990 | Jablow ................................. 395/650 |
| 4,912,628 | 3/1990 | Briggs ................................. 395/650 |
| 4,914,583 | 4/1990 | Weisshaar et al. ................... 395/650 |
| 4,985,831 | 1/1991 | Dulong et al. ....................... 395/650 |
| 5,023,771 | 6/1991 | Kishi .................................... 395/550 |
| 5,109,489 | 4/1992 | Umeno et al. ........................ 395/275 |
| 5,129,064 | 7/1992 | Fogg, Jr. et al. ..................... 395/275 |

FOREIGN PATENT DOCUMENTS 0210640 4/1987 European Pat. Off. .
0213952 11/1987 European Pat. Off. .

OTHER PUBLICATIONS

Patent Abstracts of Japan, vol. 13, No. 91, May 9, 1989 for Japanese Published Patent Application, 1-17129, published Jan. 20, 1989.

Primary Examiner—Alyssa H. Bowler
Assistant Examiner—Mehmet Geckil
Attorney, Agent, or Firm—Staas & Halsey

[57] ABSTRACT

A virtual computer system including a plurality of virtual machines running in a central processing unit with time shared, an input/output unit generating an input/output interrupt request, and a specific instruction generating part for generating a specific instruction indicating a priority to one of the virtual machines which is running. The system further includes a decision part for determining whether the input/output interrupt request addressed to one of the virtual machines has a priority equal to that indicated by the specific instruction and for generating an interrupt accepting signal when the decision result is affirmative. Moreover, the system includes a monitor part for transferring a right to use the central processing unit from the one of the virtual machines which is running to the one of the virtual machines which is addressed by the input/output interrupt request when the interrupt accepting signal from the decision part is supplied to the monitor part.

11 Claims, 5 Drawing Sheets

VIRTUAL COMPUTER SYSTEM HAVING INPUT/OUTPUT INTERRUPT CONTROL OF VIRTUAL MACHINES

This application is a continuation of application Ser. No. 07/477,547, filed Feb. 9, 1990, now abandoned.

BACKGROUND OF THE INVENTION a. Field of the Invention

The present invention generally relates to a virtual computer system, and more particularly to a virtual computer system in which a plurality of guest programs (virtual machines) run in a time shared manner in a central processing unit under the control of a virtual machine monitor. The present invention is specifically concerned with an improvement in input/output interrupt control.

b. Description of the Related Art

Conventionally, there are known various computer systems directed to improving the rate of operation. For example, there is known a virtual computer system in which a plurality of guest programs share time and run in a central processing unit under the control of a virtual machine monitor (host). Currently, such a virtual computer system is required to handle a variety of users' programs. Particularly, a guest program which needs real-time processing, such as a process control, may be required by users.

In such a case, an input/output interrupt event generated by process control mechanism must be handled with high priority. When such an input/output interrupt event is generated while a guest program for processing the process control mechanism does not run in the physical central processing unit, it is necessary to keep the input/output interrupt event waiting until the requested guest program runs in the central processing unit. Thus, there is a need for a procedure for effectively controlling priority of input/output interrupt events among the guest programs.

In a virtual computer system, it is very difficult to control input/output processing which is asynchronous to the operation of the central processing unit. Referring to FIG. 1A, there is illustrated a conventional input/output interrupt control. A plurality of virtual machines (guests) #A, #B, . . . , #D run in a central processing unit 1b with time shared. All input/output instructions and interrupts directed to the virtual machines are input to a virtual machine monitor (VMM, also called host) 1a without exception. The virtual machine monitor subjects the input instructions and interrupts to a scheduling process, and then determines which one of the virtual machines should be accessed for each instruction/interrupt. Then the virtual machine monitor 1a executes interrupt processing by emulation (software interrupt). Thus, the overhead of the system shown in FIG. 1A is large.

Another conventional virtual computer system directed to overcoming the above-mentioned shortcoming has been proposed. The proposed system handles input/output interrupts addressed to the virtual machines without intervention of the virtual machine monitor. In the proposed virtual computer system, the virtual machines are assigned different priorities. Thus, in a state where one of the virtual machines is running in the CPU, when an input/output interrupt directed to another one of the virtual machines having higher priority occurs, the right to exclusively use the CPU should be assigned to the virtual machine having higher priority instead of the virtual machine currently running. In the system shown in FIG. 1A, it is easy to assign the right to use the CPU to the higher-priority virtual machine because all input/output processings are reported to the virtual machine monitor 1a and it is sufficient for the lower-priority virtual machine to return the right to use the CPU to the virtual machine monitor 1a.

FIG. 1B illustrates a virtual computer system which handles input/output interrupts addressed to the virtual machines without intervention of the virtual machine monitor. In the configuration shown in FIG. 1B, it is impossible to discriminate only input/output interrupts directed to virtual machines having priority over the virtual machine which is running from other input/output interrupts and to inform the virtual machine monitor of only the input/output interrupts addressed to the higher-priority virtual machines. This is further described with reference to FIG. 1B.

It is now assumed that an input/output event #1 addressed to virtual machine #D occurs in an input-/output unit 5. A channel processor (CHP) 4 discriminates the input/output event #1 and accesses a corresponding sub-channel (SCH) area 22 provided in a main storage device (MS) 2. A domain identification (DMID) data 22a indicating the virtual machine #D is read out from a specific area of the sub-channel area 22 related to the virtual machine #D, and is then transferred to an interrupt pending register 30b of an interrupt hardware (IHW) 30 formed in a memory control unit (MCU) 3. The transferred domain identification data 22a is written into an area corresponding to the domain identification data 22a (virtual machine #D). As will be described later, a virtual machine monitor (VMM) 20 runs in the CPU 10 in a time shared manner with the virtual machines. Thus, the virtual machine monitor 20 is also identified by a corresponding domain information data. Hereafter, the domain identification data is referred to as a domain identifier.

On the other hand, when the virtual machine monitor (VMM) 20 dispatches the virtual machine #D by a predetermined instruction, it accesses a control block 23 corresponding to the domain identifier (DMID) indicative of the virtual machine #D. Then mask information 23b stored in a specific area of the control bock 23 is read out therefrom and transferred to an interrupt mask register 30a formed in the interrupt hardware 30. Then the transferred mask information 23b is written into a corresponding area of the interrupt mask register 30a. At this time, '0' is written into the areas of the interrupt mask register 30a which correspond to virtual machines that are not dispatched. When the domain identifier indicating the virtual machine #D is written into the interrupt mask register 30a, the interrupt hardware 30 compares the mask information relating to the virtual machine #D with the corresponding pending information of the interrupt pending register 30b. When the information coincides, the virtual machine #D is immediately made active.

It can be seen from the above description that it is impossible to initiate a non-running virtual machine until an input/output instruction addressed to this virtual machine is dispatched from the virtual machine monitor 20, even when the requested virtual machine which is not running has priority over a virtual machine which is currently running.

SUMMARY OF THE INVENTION

It is a general object of the present invention to provide an improved virtual computer system in which the aforementioned disadvantage is eliminated.

A more specific object of the present invention is to provide a virtual computer system capable of preferentially accepting an input/output interrupt addressed to a virtual machine having priority over a virtual machine which is running.

The above-mentioned objects of the present invention are achieved by a virtual computer system comprising a plurality of virtual machines running in at least one central processing unit with time shared; an input/output unit generating an input/output interrupt request; and a specific instruction generating unit for generating a specific instruction indicating a priority over one of the virtual machines which is running. The system further comprises a decision unit coupled to the input/output unit and the specific instruction generating unit, for determining whether the input/output interrupt request addressed to one of the virtual machines has a priority equal to that indicated by the specific instruction and for generating an interrupt accepting signal when it is determined that it does. Moreover, the system comprises a monitor unit operatively coupled to the plurality of virtual machines and the decision unit, for transferring a right to use the central processing unit from the one of the virtual machines which is running to the one of the virtual machines which is addressed by the input/output interrupt request when the interrupt accepting signal from the decision unit is supplied to the monitor means.

Further objects, features and advantages of the present invention will become apparent from the following detailed description when read in conjunction with the accompanying drawings.

DESCRIPTION OF THE PREFERRED EMBODIMENTS

Figure 1A:
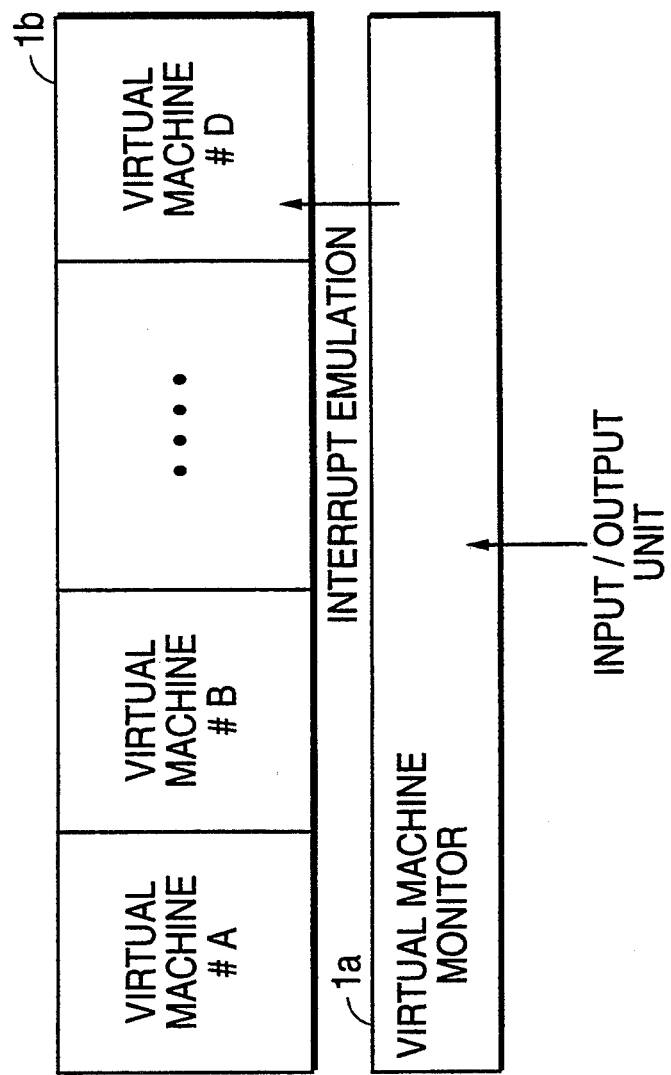
FIG. 1A is a block diagram of a conventional virtual computer system.
Figure 1B:
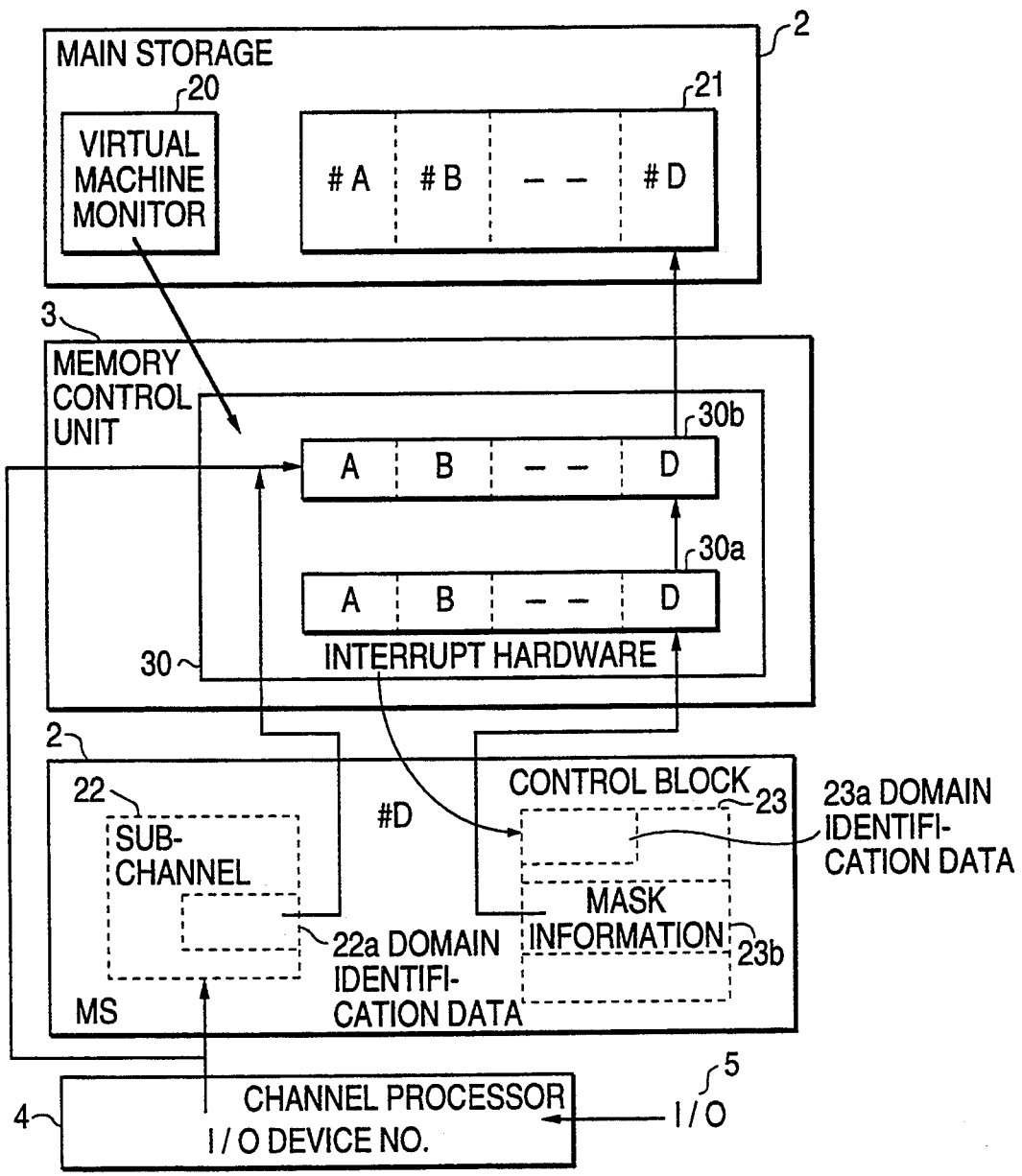
FIG. 1B is a block diagram of another conventional virtual computer system.
Figure 2:
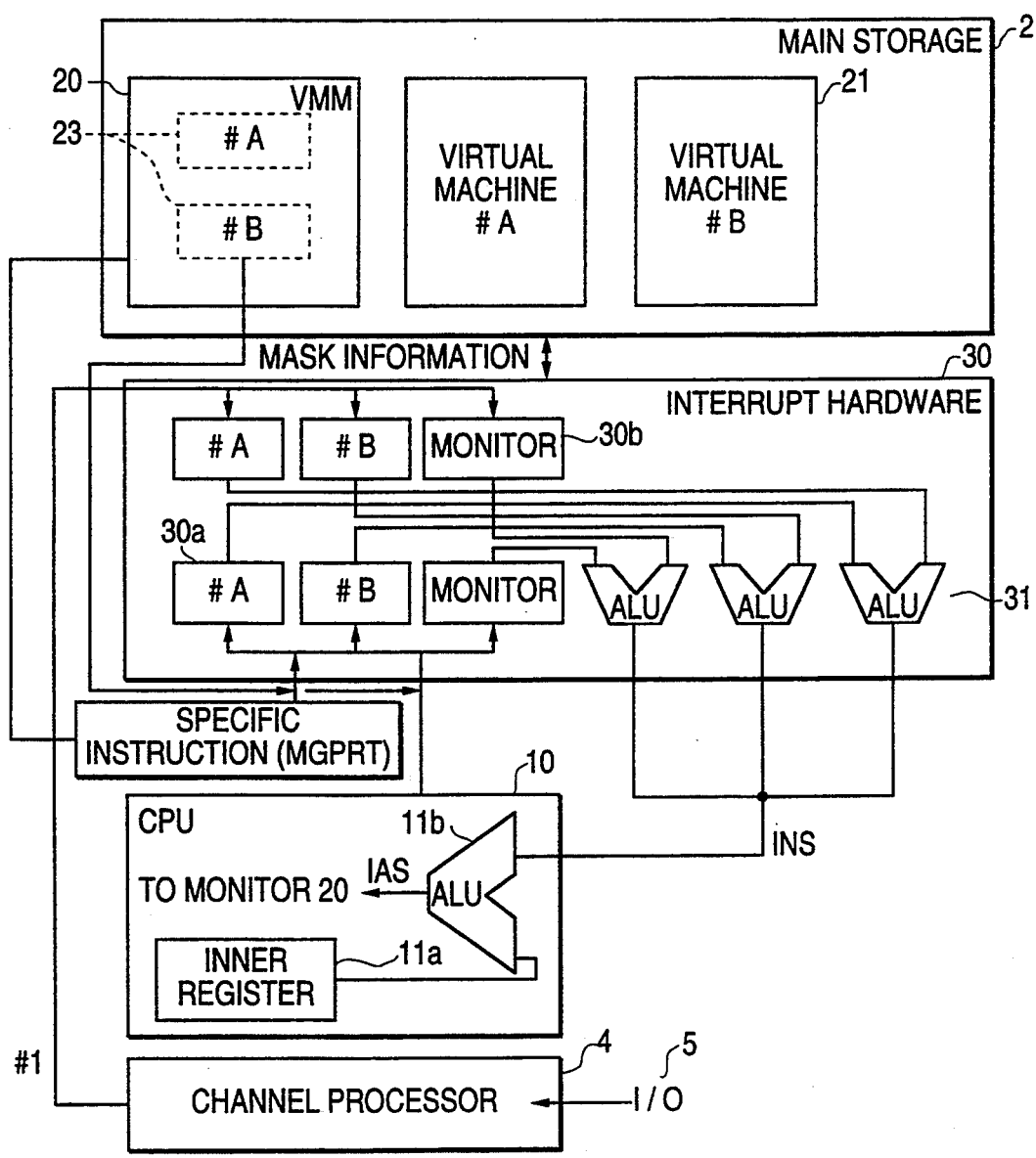
FIG. 2 is a block diagram of a virtual computer system according to a first preferred embodiment of the present invention.
Figure 3:
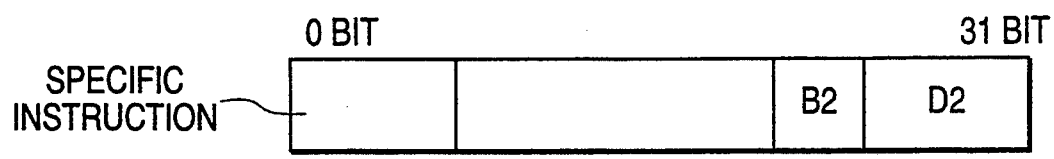
FIG. 3 is a diagram illustrating a format of a specific instruction.
Figure 4:
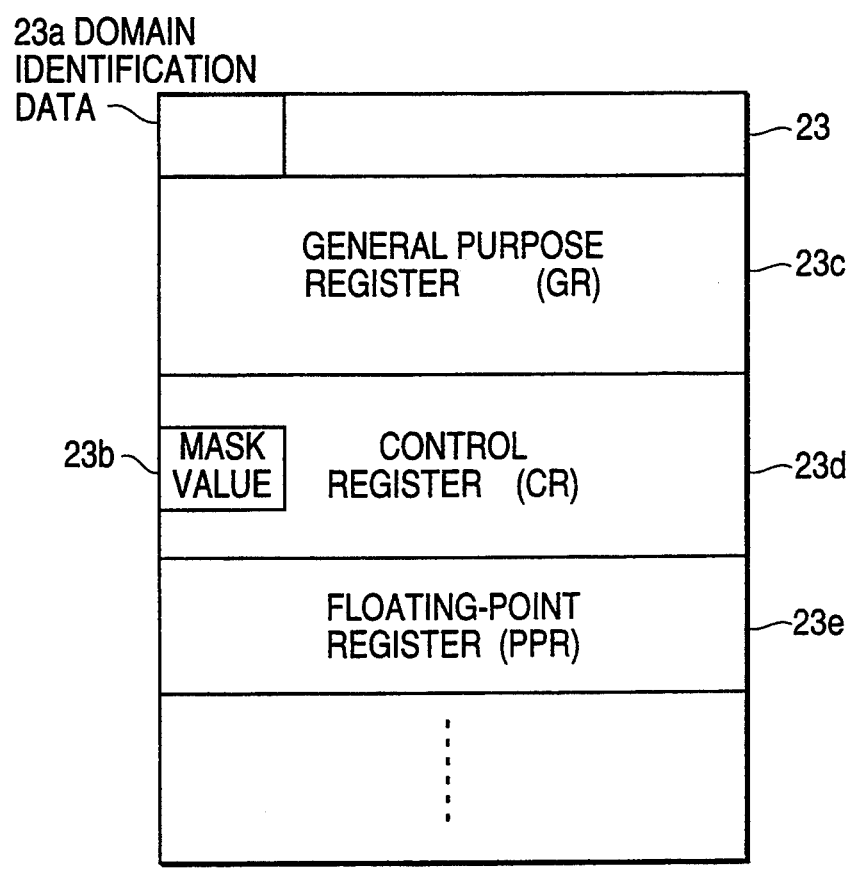
FIG. 4 is a diagram illustrating a format of a control block.

A description is given of a preferred embodiment of the present invention with reference to FIGS. 2, 3 and 4, in which those parts which are the same as those shown in FIG. 1B are given the same reference numerals. Before running a virtual machine (#A for example), the virtual machine monitor 20 executes a specific instruction (MGPRT) having an operand indicative of a virtual machine (#A) having priority over a virtual machine (#B) which is running in a CPU 10. Thereby, the virtual machine monitor 20 lets the interrupt hardware 30 know the priority relationship between the virtual machines #A and #B. Thereby, the area of the mask register 30a corresponding to the virtual machine #A is made "open". That is, the virtual machine #A is placed in an interrupt acceptable state. It is noted that in the conventional system shown in FIG. 1B, all the mask register areas except the mask register area relating to a virtual machine currently running are made closed (in a state where any interrupts are not acceptable).

When an input/output interrupt addressed to the virtual machine #A is supplied to the channel processor 4 while the virtual machine #B is running, the domain identifier (interrupt event #1) indicative of the virtual machine #A is transmitted to the interrupt pending register 30b. Then, the interrupt event #1 is written into a corresponding area of the interrupt pending register 30b. The contents of the areas of the interrupt pending register 30b and the mask register 30a corresponding to the virtual machine #A are read out therefrom and then compared with each other by a related arithmetic logic unit (ALU) provided in an ALU group 31. Each ALU of the ALU group 31 functions as an AND gate. When data in each area of the interrupt pending register 30b coincides with data in each corresponding area of the mask register 30a, the corresponding ALU outputs the data stored in each area of the interrupt pending register 30b. The outputs from the ALUs are subjected to a wired-OR operation so that a resultant signal INS (domain identifier) from the ALU group 31 is supplied to an ALU 11b provided in a CPU 10, which has an inner register 11a. The domain identifier of the virtual machine which is currently running is stored in the inner register 11a of the CPU 10. The ALU 11b generates an interrupt accepting signal IAS when the domain identifier from the ALU group 31 does not coincide with data from the inner register 11a. It is noted that when the signal INS is supplied from the ALU group 31, the corresponding input/output interrupt given by the specific instruction MGPRT always has priority to the virtual machine which is running. Then the interrupt accepting signal INS is sent to the virtual machine monitor 20.

A further description is given of the embodiment shown in FIG. 2. Each virtual machine #A and #B runs in the CPU 10 with time shared, and data relating thereto is stored in the main storage device 2. Similarly, the virtual machine monitor 20 runs in the CPU 10 with time shared with the virtual machines #A and #B, and data relating thereto is stored in the main storage device 2. As described previously, when an input/output interrupt is supplied to the channel processor 4, it automatically accesses a corresponding sub-channel (not shown for the sake of simplicity) formed in the main storage device 2 and writes the domain identifier stored therein into a corresponding area of the interrupt pending register 30b. Thereby, the request for interrupt to the addressed virtual machine is generated.

It is now assumed that the virtual machine #B is running in the CPU 10. For the sake of simplicity, two virtual machines #A and #B are described. As described previously, the virtual machine monitor 20 dispatches the virtual machine #B, and accesses a corresponding one of the control blocks 23. Then the virtual machine monitor 20 reads out mask information 23b of the virtual machine #B and writes the same into the corresponding bit area of the mask register 30a.

When the aforementioned specific instruction has not yet been issued from the virtual machine monitor 20, data '0' has been written into the area of the mask register 30a corresponding to the virtual machine #A. That is, any input/output interrupt event directed to the virtual machine #A is not accepted. When an input/output interrupt event addressed to the virtual machine #A is requested while the virtual machine #B is running, this request is held in the corresponding area of the interrupt pending register 30b provided in the interrupt hardware 30.

As described previously, the specific instruction MGPRT having priority to the virtual machine which is running is defined. A format of the specific instruction is shown in FIG. 3. The specific instruction is composed of 31 bits, for example, and has an operand consisting of address bits B2 and D2. The virtual machine monitor 20 executes the specific instruction, and accesses a control block 23 indicated by the operand of the specific instruction. A control block 23 is provided for each virtual machine.

FIG. 4 illustrates a format of each control block 23. The control block 23 has the aforementioned domain identifier 23'a. When the illustrated control block 23 relates to the virtual machine #A, domain identifier 23a indicates the virtual machine #A. Further, the control block 23 includes a general purpose register (GR) 23c, a control register (CR) 23d and a floating-point register (FPR) 23e. The mask information 23b is provided in the control register 23d.

When the control block 23 is accessed by the specific instruction MGPRT, the mask information is read out therefrom and then written into the area of the mask register 30a indicated by the domain identifier 23a written into the control block 23. Once the mask information is written into the mask register 30a, it is held until the designated virtual machine is given the right to use the CPU 10, or the specific instruction MGPRT is issued to another virtual machine. It is noted that the mask register 30a and the interrupt pending register 30b each have areas equal in number to the number of virtual machines. For example, when five virtual machines are provided, each of the registers 30a and 30b has five areas. In this case, it is possible to write mask information relating to more than one virtual machine into the corresponding areas of the mask register 30a by the specific instruction MGPRT. As described later, each of the registers 30a and 30b further has an area assigned to the virtual machine monitor 20.

It is now assumed that the specific instruction MGPRT directed to the control block 23 associated with the virtual machine #A is generated by the virtual machine monitor 20. The mask information is read out from the control block 23 and is then written into the corresponding area of the mask register 30a. It is noted that it is possible to write the mask information into the area of the mask register 30a corresponding to the virtual machine #A even when the virtual machine #B is running. In the aforementioned conventional system, such writing of the mask information relating to the virtual machine #A is inhibited.

The contents of the mask register 30a and the interrupt pending register 30b are always compared with each other independently of the status of the CPU 10. That is, the bits written into the areas of the registers 30a and 30b relating to the virtual machine #A are compared with each other, and similarly the bits written into the areas of the registers 30a and 30b relating to the virtual machine #B are compared with each other. Comparing is done by a logic AND operation on the compared bits. When the result of the comparison (logic AND operation) has a value other than zero, the interrupt hardware 30 generates the signal INS indicative of the domain identifier, which instructs the CPU 10 to execute an interrupt sequence.

It is noted that the virtual machine monitor 20 is formed by a program which is executed by the CPU 10, and is controlled in common with the virtual machines #A and #B. Thus, the mask register 30a and the interrupt pending register 30b each have an area provided for the virtual machine monitor 20.

As described previously, the CPU 10 has inner register 11a and ALU 11b. The inner register 11a has information on which one of the virtual machines #A and #B and the virtual machine monitor 20 is running. When the interrupt sequence is made active in response to the signal INS, the ALU 11b of the CPU 10 compares the content of the inner register 11a with the signal INS supplied from the interrupt hardware 30. When the signals (domain identifiers) coincide, the request for interrupt written in the interrupt pending register 30b is handled in the conventional manner. That is, this interrupt becomes acceptable when the virtual machine monitor 20 dispatches the requested virtual machine.

On the other hand, when the domain identifier from the inner register 11a does not coincide with the domain identifier from the interrupt hardware 30, the CPU 10 concludes that the request for input/output interrupt from a virtual machine (#A in this case) having priority over the virtual machine which is running (#B in this case) is acceptable. Then the CPU 10 saves operation environments of virtual machine #B in the general purpose register 23c, the control register 23d and the floating-point register 23e of the control block 23 related to the virtual machine #B. Thereafter, the CPU 10 assigns the right to use the CPU 10 to the virtual machine monitor 20.

Then, the virtual machine monitor 20 immediately assigns the right to use the CPU 10 to the virtual machine #A so that the virtual machine #A can execute the requested input/output interrupt processing.

Figure 5:
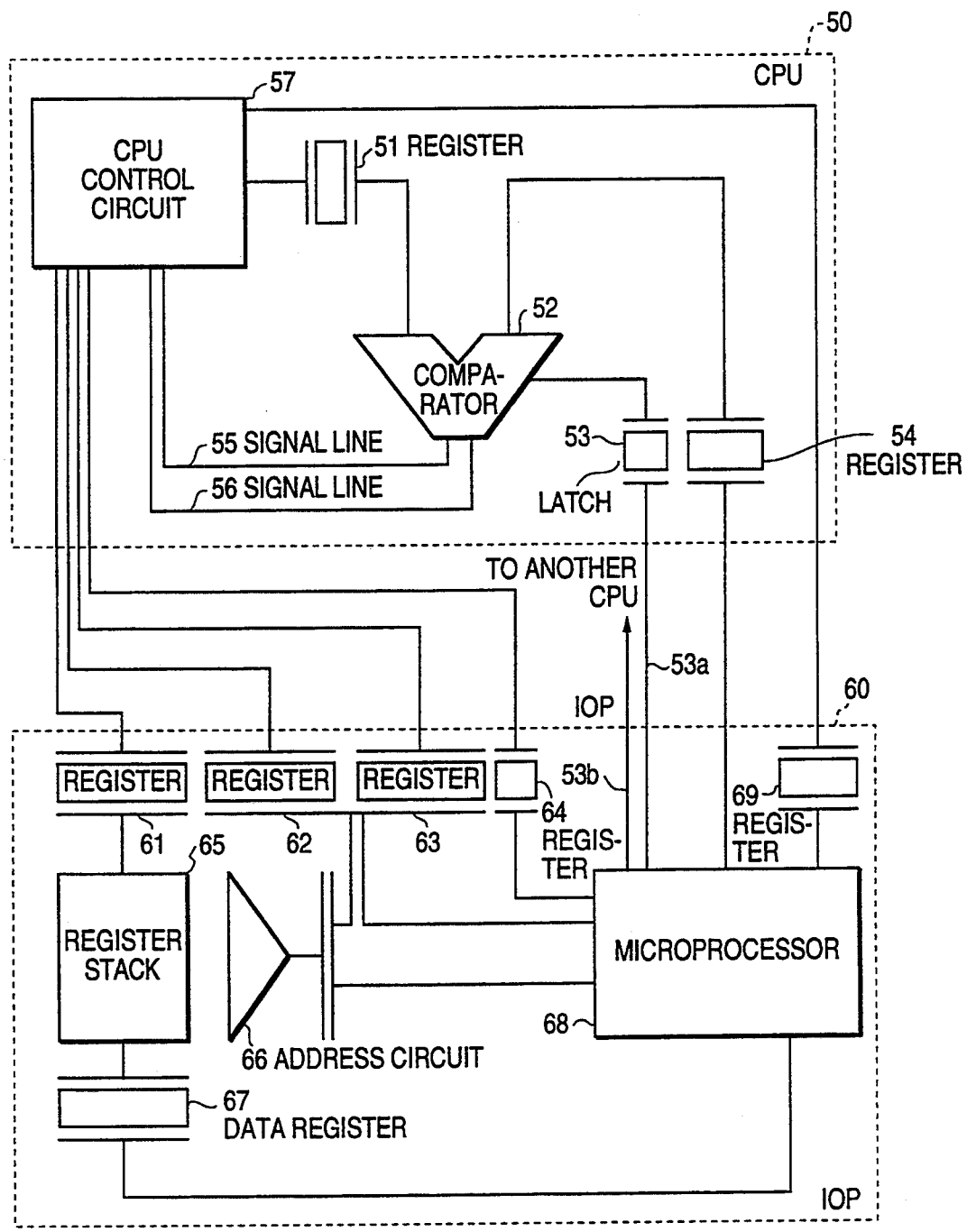
FIG. 5 is a block diagram of a second preferred embodiment of the present invention.

A description is given of a second embodiment of the present invention with reference to FIG. 5. According to the second embodiment, the function of the interrupt hardware 30 is provided in an input/output processor. The second embodiment includes a physical CPU 50 and an input/output processor 60. The CPU 50 includes a register 51, a comparator 52, a latch 53, a register 54, signal lines 55 and 56, and a CPU control circuit 57. The register 51 stores the domain identifier of a virtual machine/virtual machine monitor currently running in the physical CPU 50. When the CPU 50 generates a state transition (transfer of the right to use the CPU 50) between the virtual machine monitor and one of the virtual machines formed in the CPU 50, the domain identifier of the virtual machine monitor/virtual machine is written into the register 51. The value written into the register 51 serves as an input to the comparator 52. The latch circuit 53 stores an input/output interrupt signal 53a from the input/output processor 60. The input/output interrupt signal 53a from the input/output processor 60 is supplied to a signal line connected to a corresponding CPU (CPU 50 in the illustrated case). That is, when the input/output interrupt signal 53a is made active, it is set to a logical value '1'. The register 54 stores the domain identifier of a virtual machine/virtual machine monitor, which is sent together with the input/output interrupt signal 53a so that the input/output processor 60 lets the CPU 50 know which one of the virtual machines is related to the generated input/output interrupt signal 53a. For example, another input/output interrupt event is connected to another interrupt line 53b. The input/output processor 60 sends the domain identifier to the register 54 only when an interrupt event addressed to one of the virtual machines that is running (specified by registers 62 and 63 described later) occurs, or an input/output interrupt event which is caused by the specific instruction MGPRT and addressed to a higher-priority virtual machine (specified by a register 69) occurs. The virtual machine which is declared beforehand to have priority over the virtual machine currently running does not run in parallel with the currently running virtual machine. Thus, information such as stored in the register 63 for designating the correspondence to the physical CPU 50 is unnecessary as will be described later.

The comparator 52 compares the domain identifier from the register 54 with the domain identifier from the register 51. When the values of the supplied domain identifiers are equal, the comparator 52 activates the signal line 55 connected to he CPU control circuit 57 so that a normal input/output interrupt is generated. On the other hand, when the values of the domain identifiers are not equal, the comparator 52 makes the signal line 56 active so that an input/output interrupt caused by the specific instruction MGPRT is generated. The comparator 52 performs the comparison operation only when the signal from the latch 53 is '1'. The CPU control circuit 57 provides a CPU operation, particularly a control procedure for handling input/output interrupt.

The input/output processor 60 includes registers 61, 62, 63 and 64, a register stack 65, an address circuit 66, a data register 67, an input/output control microprocessor (hereafter simply referred to as a microprocessor) 68 and a register 69. A modified value of the mask information obtained by executing a mask information changing instruction in the CPU 50 is written into the register 61. The domain identifier used for a virtual machine or virtual machine monitor which is to run after the current time, is written into the register 62 in a case where the right to use the CPU 50 is transferred from the virtual machine monitor to one of the virtual machines, the mask changing instruction is executed by the CPU 50, or the right to use the CPU 50 is transferred from a currently running virtual machine to the virtual machine monitor. Information written into the register 62 indicates which mask information stored in the register stack 65 should be used for input/output interrupt control in the CPU 50 and which one of the areas the mask information stored in the register 61 is to be written into.

A logical CPU number of a virtual machine or virtual machine monitor which is to run after the current time, is written into the register 62 in a case where the right to use the CPU 50 is transferred from the virtual machine monitor to one of the virtual machines, the mask changing instruction is executed by the CPU 50, or the right to use the CPU 50 is transferred from a currently running virtual machine to the virtual machine monitor. "Logical CPU" is a unit of operation of the virtual machine monitor or each virtual machine. It is noted that each virtual machine is not informed beforehand of which one of the logical CPUs is used because the virtual machine monitor is free to dynamically determine beforehand which one of the logical CPUs should be run in which one of the physical CPUs. The interrupt signal 53a from the input/output processor 60 is supplied together with information on designation of one of the physical CPUs. Thus, it is necessary for the input/output processor 60 to known which one of the virtual machines relating to which one of the logical CPUs is running in which one of the physical CPUs. Information written into the register 63 indicates which mask information stored in the register stack 65 should be used for input/output interrupt control in the CPU 50 and which one of the areas the mask information stored in the register 61 is to be written into.

The register 64 stores information indicating whether the right to use the CPU 50 has been transferred between the virtual machine monitor and one of the virtual machines, or whether the input/output interrupt mask information changing instruction has been executed. When the right to use the CPU 50 has been transferred between the virtual machine monitor and one of the virtual machines, the contents of the registers 62 and 63 are read out therefrom by the microprocessor 68, and then written into a local area of the microprocessor 68 provided for a corresponding one of the physical CPUs. When the input/output processor 60 tries to issue an input/output interrupt to the corresponding one of the physical CPUs, the microprocessor 68 reads out the data stored in the corresponding local area thereof, and supplies the address generator 66 with the readout data. Thereby the corresponding mask information is read out from the corresponding area of the register stack 65, and then supplied to the microprocessor 68 through the register 67. After that, the microprocessor 68 determines whether the interrupt signal 53a should be turned ON (made active). When the input/output interrupt changing instruction is executed, the contents of the registers 62 and 63 at the same time the mask information is written into the register 61 are supplied to the address circuit 66 by the control of the microprocessor 68. Then the content of the register 61 is stored in a corresponding area of the register stack 65 which is associated with the logical CPU of the running guest on the physical CPU 50.

The register stack 65 stores values of mask information for all the logical CPUs relating to all the virtual machines/monitors. The address circuit 66 supplies the register stack 65 with an address signal. The data register 67 stores data read out from the register stack 65. The microprocessor 68 actually executes the operation of the input/output processor 60, and has a memory in which a microprogram is stored, and the aforementioned local area in which the domain identifier of the virtual machine/monitor which is operating and the logical CPU number thereof. The register 69 stores the domain identifier of the virtual machine which has been declared by the CPU 50 so as to have priority to the virtual machine which is running. The domain identifier is written into the register 69 when the specific instruction MGPRT is executed by the CPU controller 57. Registers each identical to the register 69 are provided individually for the physical CPUs. Even when the same virtual machine is declared by a plurality of physical CPUs so as to have a higher priority, a certain input/output interrupt request is not supplied to more than one of the virtual machines. That is, the microprocessor 68 selects a corresponding one of the virtual machines, and supplies the same with the input/output interrupt request.

The present invention is not limited to the specifically described embodiments, and variations and modifications may be made without departing from the scope of the present invention.

What is claimed is:

1. A virtual computer system, comprising:
   at least one central processing unit executing at least one of a plurality of virtual machines on a time shared basis;
   input/output means for generating an input/output interrupt request addressed to one of the virtual machines;
   specific instruction generating means for setting an interrupt priority of a currently unexecuting virtual machine over each currently executing virtual machine and for generating a specific instruction indicating the interrupt priority to dynamically change interrupt priorities of the virtual machines;
   decision means, operatively connected to said input/output means and said specific instruction generating means, for determining whether the input/output interrupt request addressed to the one of the virtual machines is addressed to the currently unexecuting virtual machine, said decision means including;
      an interrupt pending register having areas individually provided for each of the virtual machines, at least one of the areas including an identifier indicating the one of the virtual machines to which the input/output interrupt request will be output;
      a mask register having areas individually provided for each of the virtual machines and storing mask information indicating whether each of the virtual machines will accept the input/output interrupt request in a corresponding one of the areas for each of the virtual machines, the specific instruction being written into a corresponding one of the areas related to the priority indicated by the specific instruction;
      first logic means, operatively connected to said interrupt pending register and said mask register, for determining the one of the virtual machines requested by the input/output interrupt request by comparing the identifier stored in said interrupt pending register and the mask information stored in said mask register in each of the corresponding areas for each of the virtual machines and for outputting the identifier corresponding to the one of the virtual machines requested;
      an inner register storing an identifier for each of the currently executing virtual machines; and
      second logic means, operatively connected to said first logic means and said inner register, for determining whether the identifier supplied from said first logic means coincides with the identifier supplied from said inner register and for generating an interrupt accepting signal when it is determined that the identifier supplied from said first logic means does not coincide with the identifier supplied from said inner register; and
   monitor means, operatively connected to said decision means and said at least one central processing unit executing the virtual machines, for causing said at least one central processing unit to initiate the currently unexecuting virtual machine when said decision means determines that said input/output interrupt request is addressed to the currently unexecuting virtual machine.

2. A virtual computer system as claimed in claim 1, wherein said specific instruction generating means generates the specific instruction before said monitor means causes said at least one central processing unit to initiate the currently unexecuting virtual machine.

3. A virtual computer system as claimed in claim 1, wherein said inner register is provided in said at least one central processing unit, and said second logic means is implemented by said at least one central processing unit.

4. A virtual computer system as claimed in claim 1, further comprising:
   memory means for storing the mask information to be stored in said mask register; and
   readout means, operatively connected to said memory means and said mask register, for reading out the mask information from said memory means and writing the same into a corresponding one of the areas of said mask register.

5. A virtual computer system as claimed in claim 1, further comprising storage means for storing control data relating to the currently executing virtual machines and for updating the control data when the right to use said at least one central processing unit is transferred to the one of the virtual machines addressed by the input/output interrupt request.

6. A virtual computer system as claimed in claim 1, wherein the virtual machines run in a plurality of central processing units.

7. A virtual computer system as claimed in claim 1, wherein the specific instruction generating means writes the identifier of the one of the virtual machines associated with the specific instruction into a corresponding one of the areas of said mask register when said specific instruction generating means generates the specific instruction.

8. A virtual computer system as claimed in claim 1, wherein said interrupt decision means, said comparison means of said control processing unit, and the one of the virtual machines currently running in said control processing unit operate concurrently.

9. A virtual computer system as claimed in claim 8,
   wherein said virtual machine monitor means is executed by said control processing unit,
   wherein said main storage means stores data corresponding to said virtual machine monitor means, and
   wherein said virtual machine monitor means causes said control processing unit to run the at least one of the first and second virtual machines identified by the interrupt request domain identifier in accordance with the interrupt acceptance signal.

10. A virtual computer system as claimed in claim 1,
    wherein at least said virtual machine monitor means and said specific instruction generating means form an input/output processor operatively connected to said main storage means, and
    wherein said input/output processor comprises a microprocessor.

11. A virtual computer system as claimed in claim 10, wherein said input/output processor further includes said interrupt decision means.

* * * * *